(12) United States Patent
Frantz et al.

(10) Patent No.: US 12,153,577 B1
(45) Date of Patent: *Nov. 26, 2024

(54) ENABLING EDITABLE TABLES ON A CLOUD-BASED DATA WAREHOUSE

(71) Applicant: SIGMA COMPUTING, INC., San Francisco, CA (US)

(72) Inventors: Jason D. Frantz, San Francisco, CA (US); Max H. Seiden, San Francisco, CA (US); Kenneth Truong, Temple City, CA (US); Robert C. Woollen, San Rafael, CA (US); James L. Gale, San Francisco, CA (US)

(73) Assignee: SIGMA COMPUTING, INC., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/500,918

(22) Filed: Nov. 2, 2023

Related U.S. Application Data

(63) Continuation of application No. 17/513,707, filed on Oct. 28, 2021, now Pat. No. 11,841,858, which is a
(Continued)

(51) Int. Cl.
*G06F 16/00* (2019.01)
*G06F 16/21* (2019.01)
(Continued)

(52) U.S. Cl.
CPC ...... *G06F 16/24544* (2019.01); *G06F 16/211* (2019.01); *G06F 16/2282* (2019.01); *G06F 16/2308* (2019.01); *G06F 40/177* (2020.01)

(58) Field of Classification Search
CPC ............. G06F 16/24544; G06F 16/211; G06F 16/2282; G06F 16/2308
See application file for complete search history.

(56) References Cited

U.S. PATENT DOCUMENTS

| | | | |
|---|---|---|---|
| 11,163,770 B2* | 11/2021 | Frantz | G06F 16/2282 |
| 11,841,858 B2* | 12/2023 | Frantz | G06F 16/24544 |
| 2003/0018644 A1 | 1/2003 | Bala et al. | |
| 2014/0244573 A1 | 8/2014 | Gonsalves | |

FOREIGN PATENT DOCUMENTS

| | | |
|---|---|---|
| EP | 2923263 A2 | 9/2015 |
| WO | 2005076160 | 8/2005 |
| WO | 2018132478 A1 | 7/2018 |

OTHER PUBLICATIONS

Liam Friedland, "Accessing The Data Warehouse: Designing Tools To Facilitate Business Understanding," pp. 1-12, ACM, vol. 26, pp. 65-74 (Year: 1997).*

(Continued)

*Primary Examiner* — Cheryl Lewis

(57) ABSTRACT

Enabling editable tables on a cloud-based data warehouse including receiving, by a query manager, a client-provided table; receiving, by the query manager from a query manager client, a request to create a referencing worksheet using, as data sources, the client-provided table and a database table on a cloud-based data warehouse; storing, by the query manager, the client-provided table in the schema storage location on the cloud-based data warehouse, wherein the schema storage location is a storage location on the cloud-based data warehouse to which the query manager has read and write access, and wherein the database table is external to the schema storage location; generating, by the query manager, a database query to create the referencing worksheet, wherein the database query targets the client-provided table in the schema storage location and the database table; and issuing, by the query manager, the database query to the cloud-based data warehouse.

20 Claims, 5 Drawing Sheets

Related U.S. Application Data continuation of application No. 16/822,402, filed on Mar. 18, 2020, now Pat. No. 11,163,770.

(60) Provisional application No. 62/820,358, filed on Mar. 19, 2019.

(51) Int. Cl.
  *G06F 16/22* (2019.01)
  *G06F 16/23* (2019.01)
  *G06F 16/2453* (2019.01)
  *G06F 40/177* (2020.01)

(56) References Cited

OTHER PUBLICATIONS

L. Friedland, "Accessing The Data Warehouse: Designing Tools To Facilitate Business Understanding," Interactions, 1998, ACM, pp. 1-12. (Year: 1998).*

Surajit Chaudhuri and Umeshwar Dayal, "An Overview of Data Warehousing and OLAP Technology," ACM 1997, dl.acm.org, pp. 1-10. (Year: 1997).*

"Sigma Computing—Product Tour," YouTube, https://www.youtube.com/watch?v=nkcprbRiztY, Jun. 14, 2018, 2 pages.

Garani et al., "A Data Warehouse Approach for Business Intelligence," IEEE 28th International Conference on Enabling Technologies: infrastructure for Collaborative Enterprises (WETICE), IEEE 2019, pp. 70-75.

International Search Report and Written Opinion, PCT/US2020/023311, Jul. 8, 2020, 11 pages.

Ly, Duong Hai. "Data Analytics in Cloud Data Warehousing: Case Company," Metropolia University of Applied Sciences, Bachelor of Engineering, Information Technology, Bachelor's Thesis, Feb. 28, 2019, 70 pages.

Ramanathan et al., "Comparison of Cloud Database: Amazon's Simple DB and Google's Bigtable, " International Conference on Recent Trends in Information Systems, IEEE, 2011, pp. 165-168.

Soliman et al. "A Framework for Emulating Database Operations in Cloud Data Warehouses," Industry 3: Cloud and Distributed Databases, SIGMOD '20, Portland, OR, USA, Jun. 14-19, 2020, pp. 1447-1461.

* cited by examiner

ENABLING EDITABLE TABLES ON A CLOUD-BASED DATA WAREHOUSE

RELATED U.S. APPLICATION DATA

Continuation of Ser. No. 17/513,707, filed Oct. 28, 2021, now U.S. Pat. No. 11,841,858, which is a continuation of Ser. No. 16/822,402, filed Mar. 18, 2020, now U.S. Pat. No. 11,163,770, which claims priority from Provisional Application 62/820,358, filed Mar. 19, 2019.

BACKGROUND

Field of the Invention

The field of the invention is data processing, or, more specifically, methods, apparatus, and products for enabling editable tables on a cloud-based data warehouse.

Description of Related Art

Modern businesses may store large amounts of data in remote databases within cloud-based data warehouses. However, changes to such databases may be tightly managed by database administrators. Users of the database may be unable to incorporate their own data into worksheets generated from the database.

SUMMARY

Methods, systems, and apparatus for enabling editable tables on a cloud-based data warehouse. Enabling editable tables on a cloud-based data warehouse includes receiving, by a query manager, a client-provided table; receiving, by the query manager from a query manager client, a request to create a referencing worksheet using, as data sources, the client-provided table and a database table on a cloud-based data warehouse; storing, by the query manager, the client-provided table in the schema storage location on the cloud-based data warehouse, wherein the schema storage location is a storage location on the cloud-based data warehouse to which the query manager has read and write access, and wherein the database table is external to the schema storage location; generating, by the query manager, a database query to create the referencing worksheet, wherein the database query targets the client-provided table in the schema storage location and the database table on the cloud-based data warehouse; and issuing, by the query manager, the database query to the cloud-based data warehouse.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION

Figure 1:
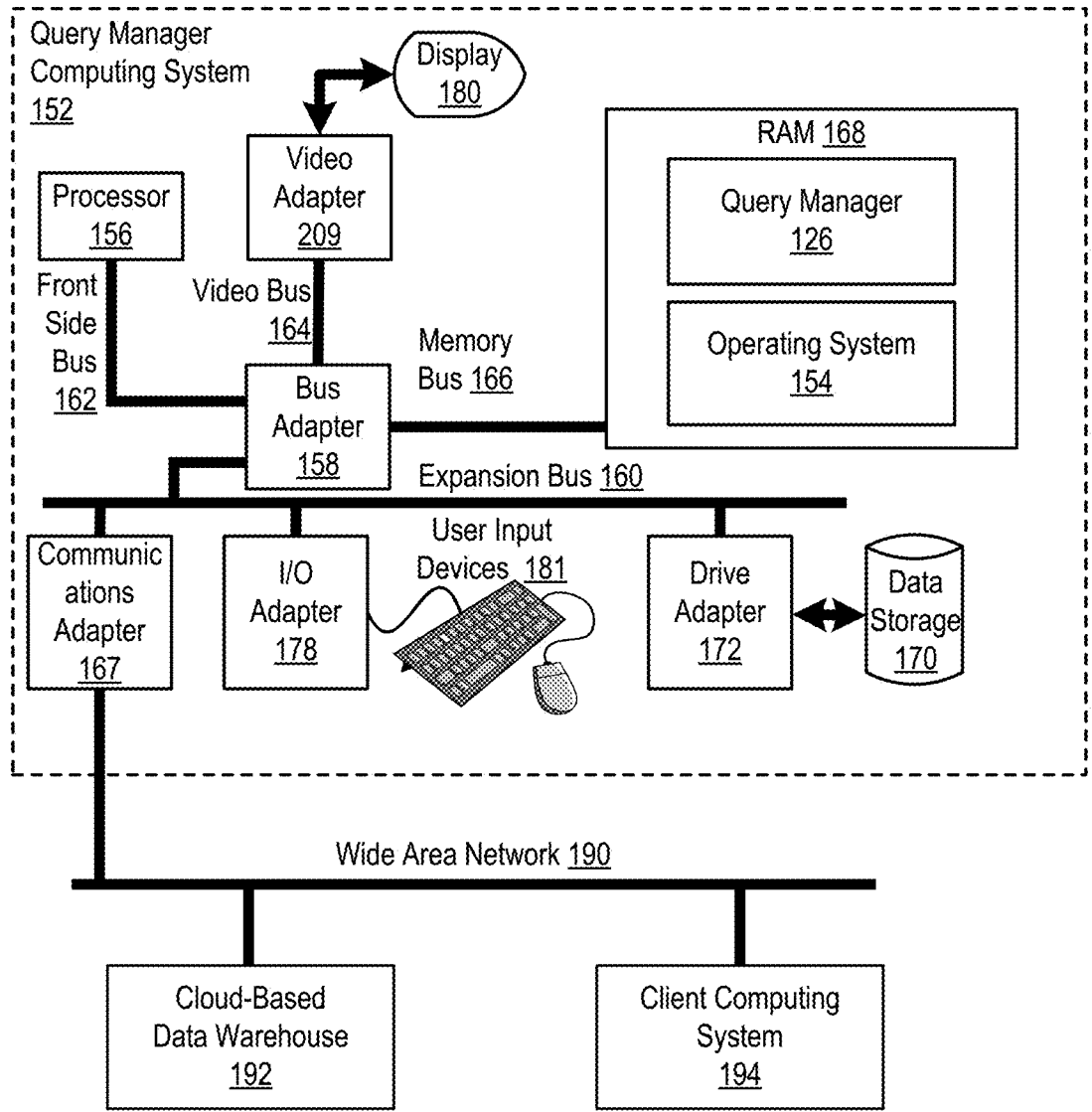
FIG. 1 sets forth a block diagram of an example system configured for enabling editable tables on a cloud-based data warehouse according to embodiments of the present invention.

Exemplary methods, apparatus, and products for enabling editable tables on a cloud-based data warehouse in accordance with the present invention are described with reference to the accompanying drawings, beginning with FIG. 1. FIG. 1 sets forth a block diagram of automated computing machinery comprising an exemplary query manager computing system (152) configured for enabling editable tables on a cloud-based data warehouse according to embodiments of the present invention. The query manager computing system (152) of FIG. 1 includes at least one computer processor (156) or 'CPU' as well as random access memory (168) ('RAM') which is connected through a high speed memory bus (166) and bus adapter (158) to processor (156) and to other components of the query manager computing system (152).

Stored in RAM (168) is an operating system (154). Operating systems useful in computers configured for enabling editable tables on a cloud-based data warehouse according to embodiments of the present invention include UNIX™, Linux™, Microsoft Windows™, AIX™ IBM's iOS™, and others as will occur to those of skill in the art. The operating system (154) in the example of FIG. 1 is shown in RAM (168), but many components of such software typically are stored in non-volatile memory also, such as, for example, on data storage (170), such as a disk drive. Also stored in RAM is the query manager (126), a module for enabling editable tables on a cloud-based data warehouse according to embodiments of the present invention.

The query manager computing system (152) of FIG. 1 includes disk drive adapter (172) coupled through expansion bus (160) and bus adapter (158) to processor (156) and other components of the query manager computing system (152). Disk drive adapter (172) connects non-volatile data storage to the query manager computing system (152) in the form of data storage (170). Disk drive adapters useful in computers configured for enabling editable tables on a cloud-based data warehouse according to embodiments of the present invention include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example query manager computing system (152) of FIG. 1 includes one or more input/output ('I/O') adapters (178). I/O adapters implement user-oriented input/output through, for example, software drivers and computer hardware for controlling output to display devices such as computer display screens, as well as user input from user input devices (181) such as keyboards and mice. The example query manager computing system (152) of FIG. 1 includes a video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The exemplary query manager computing system (152) of FIG. 1 includes a communications adapter (167) for data communications with other computers and for data communications with a data communications network. Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful in computers configured for enabling editable tables on a cloud-based data warehouse according to embodiments of the present invention include modems for wired dial-up communications, Ethernet (IEEE 802.3) adapters for wired data communications, and 802.11 adapters for wireless data communications.

The communications adapter (167) is communicatively coupled to a wide area network (190) that also includes a cloud-based data warehouse (192) and a client computing system (194). The cloud-based data warehouse (192) is a computing system or group of computing systems that hosts a database for access over the wide area network (190). The client computing system (194) is a computing system that accesses the database via the query manager computing system (152).

Figure 2:
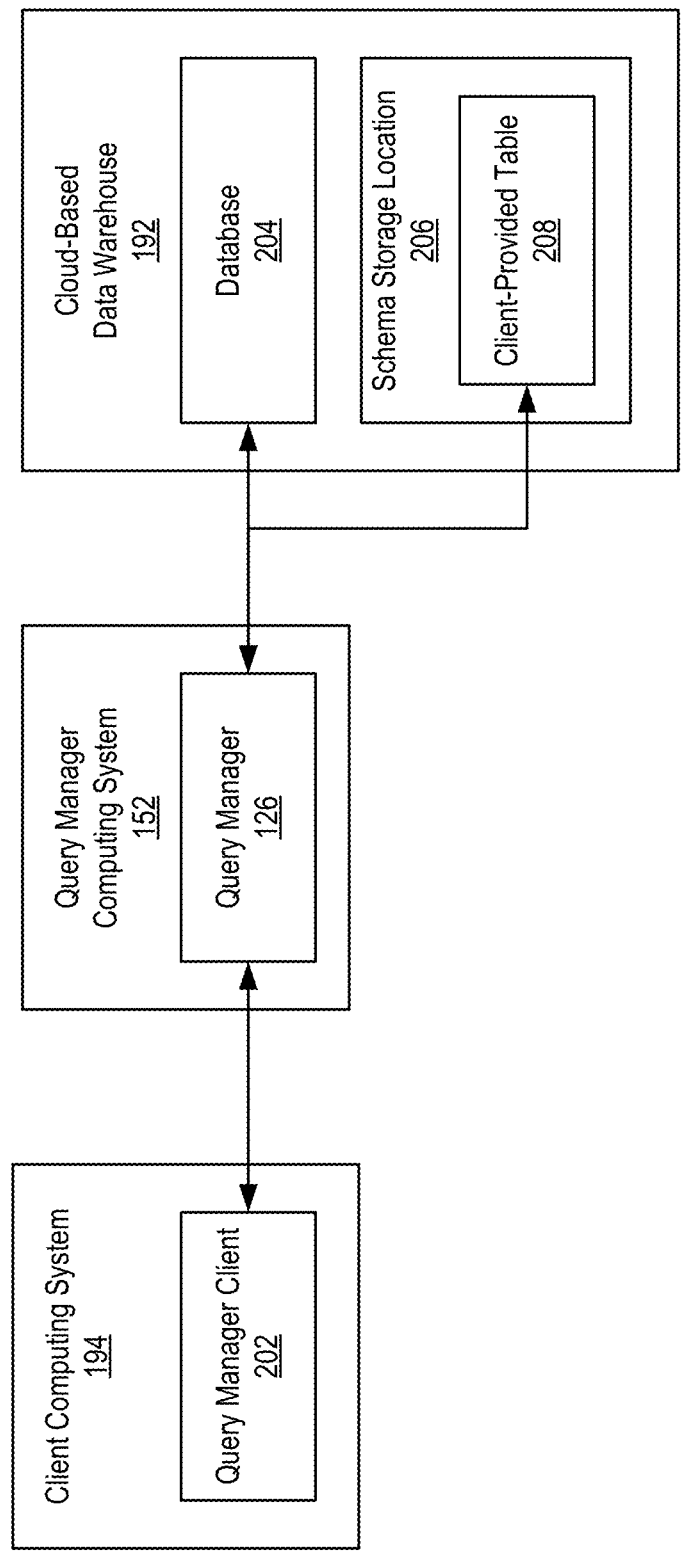
FIG. 2 sets forth a block diagram of an example system configured for enabling editable tables on a cloud-based data warehouse according to embodiments of the present invention.

FIG. 2 shows an exemplary block diagram of a system for enabling editable tables on a cloud-based data warehouse according to embodiments of the present invention. As shown in FIG. 2, the system includes a client computing system (194), a query manager computing system (152), and a cloud-based data warehouse (192). The client computing system (194) includes a query manager client (202). The query manager computing system (152) includes a query manager (126). The cloud-based data warehouse (192) includes a database (204) and a schema storage location (206). The schema storage location (206) includes a client-provided table (208).

The query manager (126) is hardware, software, or an aggregation of hardware and software configured to receive and manage client-provided tables. The query manager (126) is also configured to generate database queries in response to requests, from a query manager client (202), for data sets in the form of worksheets.

A worksheet is a presentation of a data set from a database (204). A referencing worksheet is a worksheet that is linked from one or more data sources, such as other worksheets (referred to as data source worksheet). The referencing worksheet inherits the data set presented in the data source worksheets (i.e., data not excluded from presentation). The referencing worksheet may also inherit the results of formula applied to other data but not the formulas themselves. The referencing worksheet may be limited to the data set presented or otherwise made available in the data source worksheet (unless the user generating the referencing worksheet has access to excluded data in the database). Changes made to the data source worksheet are reflected in the referencing worksheet. For example, if a column is added to and presented in the data source worksheet, the column would then appear in or be available to the referencing worksheet.

A referencing worksheet may be linked from any number of data sources. Such data sources may include a database table from the database (204) on the cloud-based data warehouse (192). The database (204) is a collection of data and a management system for the data. A database table is a collection of data from the database (204). The database table may be an organization of data generated in response to a database query and provided to the query manager (126). The database table may include data organized into columns and rows.

The database (204) may be editable primarily by a database administrator or by applications authorized by the database administrator to edit the database (204). Changes to the database (204) may be closely managed, and most users and entities, including a user of the client computing system (194) and the query manager (126), may be limited to read-only access to the database (204). However, a database administrator may grant a query manager (126) read and write access to a schema storage location (206) isolated from the rest of the database (204). The schema storage location (206) is a storage location on the cloud-based data warehouse (192) to which the query manager (126) has read and write access. The query manager (126) may only have read-only access to the remainder of the cloud-based data warehouse (192), including the data in a database table.

A referencing worksheet may also be linked from a client-provided table (208). The client-provided table (208) may include data organized into columns and rows. The client-provided table (208) is a collection of data provided by a user and is not stored on the database (204) on cloud-based data warehouse (192) (other than in the schema storage location (206)). The client-provided table (208) is also not managed by the database administrator. The client-provided table (208) may be provided to the query manager (126) by a user, such as a user of the client computing system (194). The client-provided table (208) may be generated by the user within the query manager client (202), or imported into the query manager client (202) and provided to the query manager (126).

The client-provided table (208) may include a join key to the database table. Specifically, at least one column of the client-provided table (208) may include values that match values in at least one column of the database table. Using the join keys, data in other columns of the client-provided table (208) corresponding to the row that includes the join key may be matched to data in other columns of the database table corresponding to the row that includes the same join key.

The query manager (126) may send a single database query to the cloud-based data warehouse (192) that targets both the database (204) and tables in the schema storage location (206). The query may also include instructions to perform computations on the cloud-based data warehouse (192) using data from either the database (204), tables in the schema storage location (206), or both.

The query manager client (202) is hardware, software, or an aggregation of hardware and software configured to request, from the query manager (126), the creation of a referencing worksheet. The request may indicate that the referencing worksheet is to use, as data sources, a client-provided table (208) and a database table from the cloud-based data warehouse (192).

The query manager client (202) may include a graphical user interface (GUI) that presents data set in the form of a worksheet and graphical elements to a client and receives client input from the client. The GUI may be presented, in part, by the query manager (126) and displayed on a client computing system (194) (e.g., on a system display or mobile touchscreen). The query manager client (202) may be an Internet application hosted on the query manager computing system (152) and initiate the presentation of the GUI on the client computing system (194).

Figure 3:
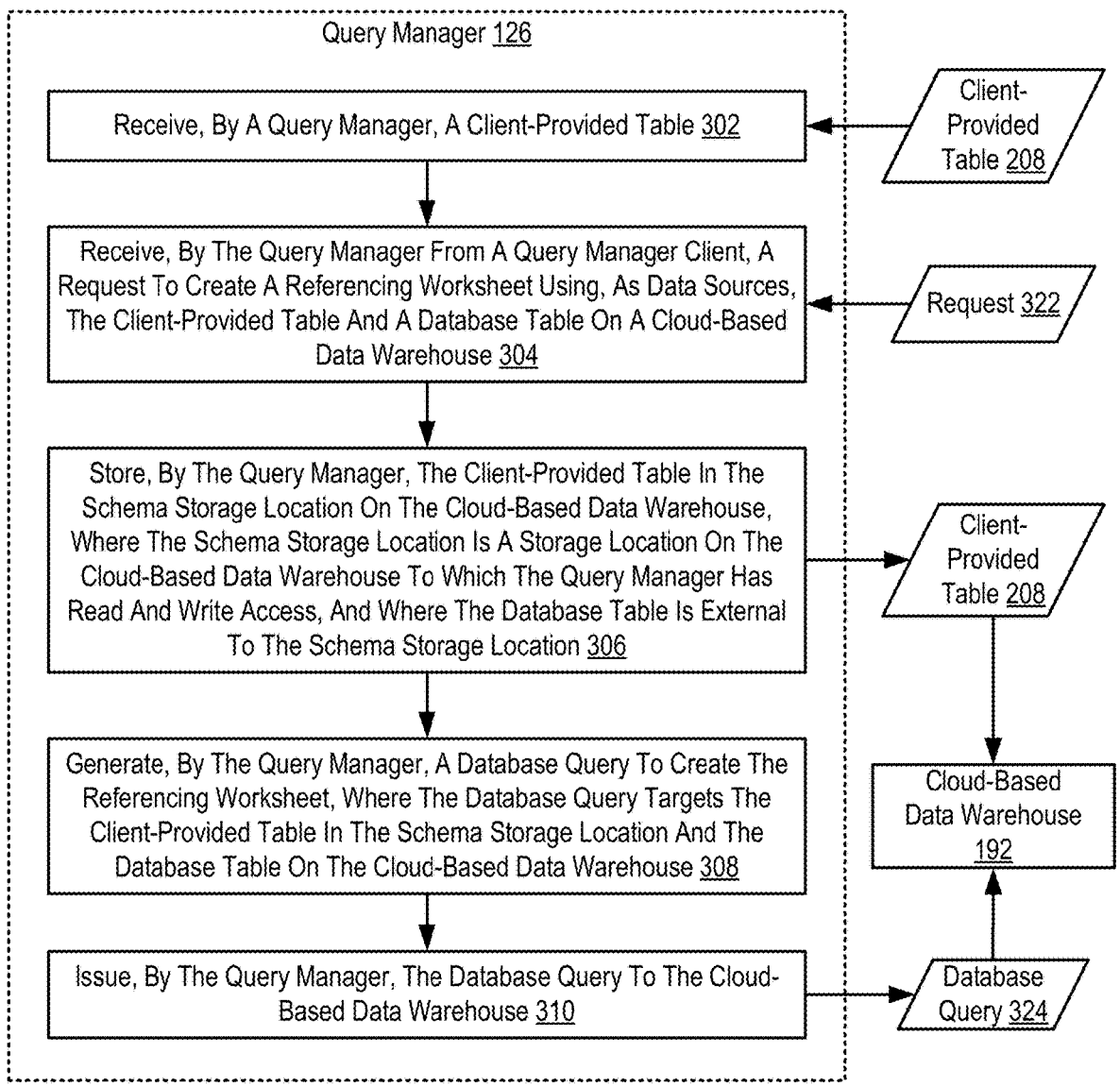
FIG. 3 sets forth a flow chart illustrating an exemplary method for enabling editable tables on a cloud-based data warehouse according to embodiments of the present invention.

For further explanation, FIG. 3 sets forth a flow chart illustrating an exemplary method for enabling editable tables on a cloud-based data warehouse according to embodiments of the present invention that includes receiving (302), by a query manager (126), a client-provided table (208). Receiving (302), by a query manager (126), a client-provided table (208) may be carried out by the query manager (126) obtaining the client-provided table (208) from a user. The client-provided table (208) may be in the form of a spreadsheet file, comma-separated values file, or other tabular data file. Alternatively, the query manager (126) may receive values from a user and generate and organize the client-provided table (208) using the values received from a user. The client-provided table (208) may be received via a query manager client.

The method of FIG. 3 further includes receiving (304), by the query manager (126) from a query manager client, a request (322) to create a referencing worksheet using, as data sources, the client-provided table (208) and a database table on a cloud-based data warehouse (192). Receiving (304), by the query manager (126) from a query manager client, a request (322) to create a referencing worksheet using, as data sources, the client-provided table (208) and a database table on a cloud-based data warehouse (192) may be carried out by receiving inputs into a GUI of the query manager client requesting the creation of the referencing worksheet. The request (322) may include a reference to the database table (or columns within the database table) and a reference to the client-provided table (208) (or columns within the client-provided table (208)).

Receiving (304), by the query manager (126) from a query manager client, a request (322) to create a referencing worksheet may also be carried out by receiving a request to create the referencing worksheet by joining the client-provided table and the database table into the referencing worksheet. The request (322) may include a reference to a join key for matching the columns of the database table to the columns of the client-provided table (208).

The query manager (126) may receive the client-provided table (208) and the request (322) from the same instance of the query manager client or from different users of different instances of the query manager client. Further, the query manager (126) may obtain the client-provided table (208) from an entity other than a query manager client.

The method of FIG. 3 further includes storing (306), by the query manager (126), the client-provided table (208) in the schema storage location on the cloud-based data warehouse (192), wherein the schema storage location is a storage location on the cloud-based data warehouse (192) to which the query manager (126) has read and write access, and wherein the database table is external to the schema storage location. Storing (306), by the query manager (126), the client-provided table (208) in the schema storage location on the cloud-based data warehouse (192), wherein the schema storage location is a storage location on the cloud-based data warehouse (192) to which the query manager (126) has read and write access, and wherein the database table is external to the schema storage location may be carried out by accessing the schema storage location on the cloud-based data warehouse (192) and placing a copy of the client-provided table (208) in the schema storage location.

The method of FIG. 3 further includes generating (308), by the query manager (126), a database query (324) to create the referencing worksheet, wherein the database query (324) targets the client-provided table (208) in the schema storage location and the database table on the cloud-based data warehouse (192). Generating (308), by the query manager (126), a database query (324) to create the referencing worksheet, wherein the database query (324) targets the client-provided table (208) in the schema storage location and the database table on the cloud-based data warehouse (192) may be carried out by using the reference to the client-provided table (208) and the reference to the database table to populate the database query (324). The database query (324) may be a single structured query language statement.

The database query (324) may include an instruction, to the cloud-based data warehouse, to perform a computation using the client-provided table (208) in the schema storage location and the database table on the cloud-based data warehouse. Specifically, an amount of processing may be required to produce the data set that is provided to the query manager (126) in response to the database query (324). For example, the referencing worksheet may include a calculation column that uses, as inputs, values from both the client-provided table (208) and the database table. The computations are performed on the cloud-based data warehouse (192) and the results provided in the data set response to the data query (324).

The method of FIG. 3 further includes issuing (310), by the query manager (126), the database query (324) to the cloud-based data warehouse (192). Issuing (310), by the query manager (126), the database query (324) to the cloud-based data warehouse (192) may be carried out by sending the generated database query (324) over a wide area network to the database and schema storage location on the cloud-based data warehouse (192). Once the data set is received from the cloud-based data warehouse (192) in response to the database query (324), the query manager (126) presents the data set as a worksheet to a user via the query manager client (202).

For example, assume that a large organization maintains a database describing each flight taken by every salesperson employed by the company. The database includes flight information including departure and arrival dates and times, departure airport, arrival airport, airline, and salesperson ID number. The database also includes data describing the sales of each salesperson that includes information including salesperson ID number, date of the sale, and value of the sale. If a salesperson wanted to create a table of each flight she took that includes the departure date, arrival time, and airline, but also includes the number of sales and value of sales made during each trip, that salesperson may request a table be generated, and that table may be generated using only the data provided in the organization-maintained database.

Assume, however, that the salesperson wants to evaluate a possible correlation between number of sales made and whether the salesperson used one of her preferred airlines. The salesperson may generate a client-provided table that includes a column for each airline and the salesperson's subjective rating of the airline on a scale from 1 to 10. The salesperson may be unable to add this subjective rating to the organization-maintained database and does not what her airline opinions made available to the rest of the organization. The salesperson may then provide the client-provided table to the query manager by creating the client-provided table locally on the salespersons computing system, and uploading the client-provided table to the query manager (e.g., via the query manager client).

Continuing with the example, the query manager may then receive a request to create a referencing worksheet that includes columns from the organization-maintained database table including airline and sales made during the trip, and a column for the airline rating from the salesperson's client-provided table. The query manager may then store the most current version of the client-provided table in a schema storage location on the cloud-based data warehouse that hosts the organization-maintained database. The query manager then generates a database query to generate the referencing worksheet that includes both the client-provided table in the schema storage location and the organization-maintained database table. The database query is then issued to the cloud-based data warehouse.

The above limitations improve the operation of the computer system by providing a mechanism to generate a database query to create a worksheet incorporating both data from a database unalterable by a user and data from a table alterable by a user. This is accomplished by storing the client-provided table on the data warehouse in a storage location to which the query manager has write access. Then a database query is generated targeting both the database table and the client-provided table on the data warehouse, and the computations necessary to satisfy the database query are performed on the data warehouse.

Figure 4:
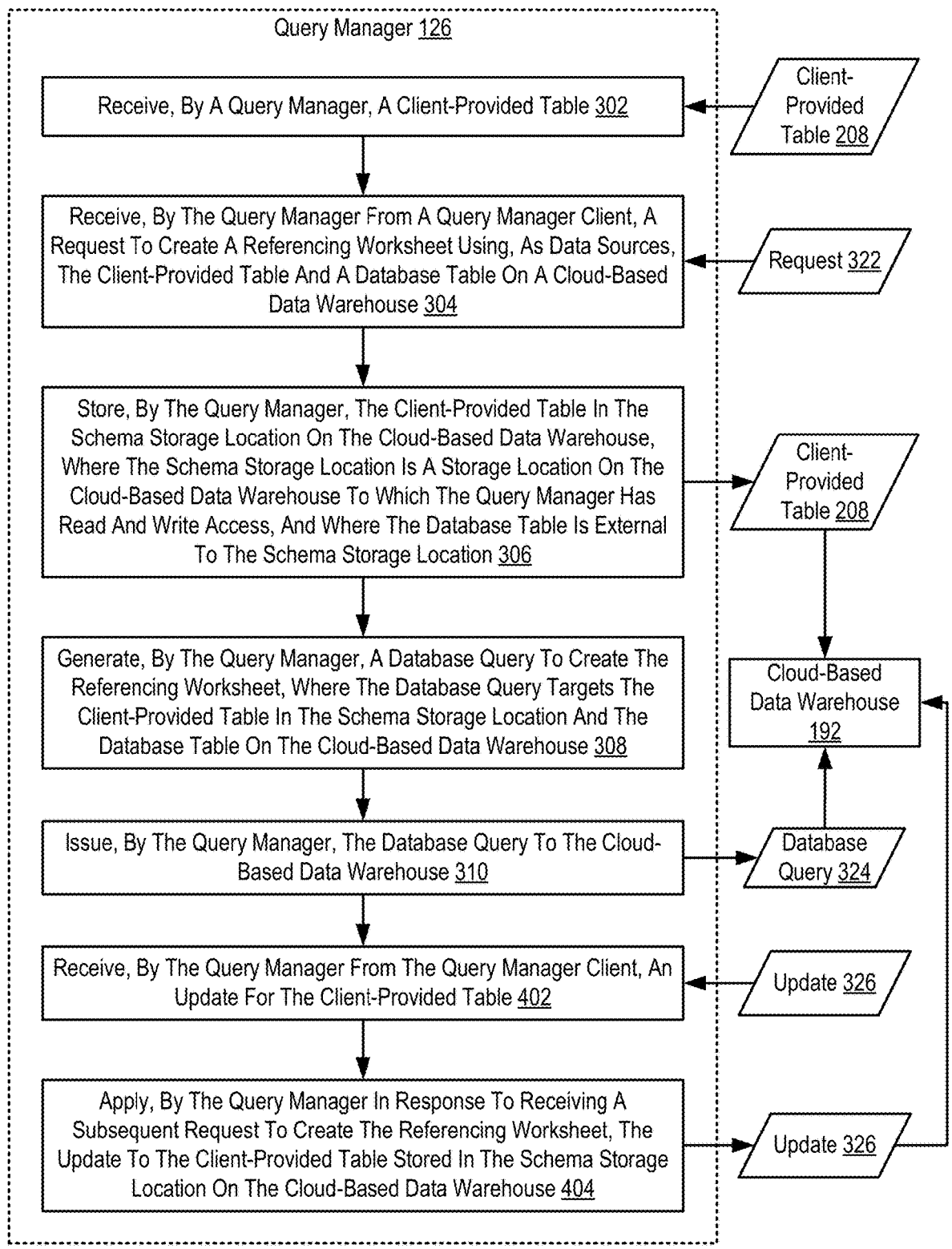
FIG. 4 sets forth a flow chart illustrating an exemplary method for enabling editable tables on a cloud-based data warehouse according to embodiments of the present invention.

For further explanation, FIG. 4 sets forth a flow chart illustrating a further exemplary method for enabling editable tables on a cloud-based data warehouse according to embodiments of the present invention that includes receiving (302), by a query manager (126), a client-provided table (208); receiving (304), by the query manager (126) from a query manager client, a request (322) to create a referencing worksheet using, as data sources, the client-provided table (208) and a database table on a cloud-based data warehouse (192); storing (306), by the query manager (126), the client-provided table (208) in the schema storage location on the cloud-based data warehouse (192), wherein the schema storage location is a storage location on the cloud-based data warehouse (192) to which the query manager (126) has read and write access, and wherein the database table is external to the schema storage location; generating (308), by the query manager (126), a database query (324) to create the referencing worksheet, wherein the database query (324) targets the client-provided table (208) in the schema storage location and the database table on the cloud-based data warehouse (192); and issuing (310), by the query manager (126), the database query (324) to the cloud-based data warehouse (192).

The method of FIG. 4 differs from the method of FIG. 3, however, in that the method of FIG. 4 further includes receiving (402), by the query manager (126) from the query manager client, an update (326) for the client-provided table; and applying (404), by the query manager (126) in response to receiving a subsequent request to generate the referencing worksheet, the update (326) to the client-provided table stored in the schema storage location on the cloud-based data warehouse (192).

Receiving (402), by the query manager (126) from the query manager client, an update (326) for the client-provided table may be carried out by the user submitting changes to the client-provided table (208) to the query manager (126). The changes may not be propagated to the copy of the client-provided table (208) in the schema storage location on the cloud-based storage warehouse (192) until the query manager (126) receives a subsequent request to create a referencing worksheet using the client-provided table (208) as a data source.

Applying (404), by the query manager (126) in response to receiving a subsequent request to generate the referencing worksheet, the update (326) to the client-provided table stored in the schema storage location on the cloud-based data warehouse (192) may be carried out by updating the client-provided table (208) to the schema storage location on the cloud-based storage warehouse (192 only after receiving the subsequent request to generate the referencing worksheet using the client-provided table (208). The subsequent request may be a different request from the previous request (322) to create the referencing worksheet. The subsequent request may utilize the client-provided table (208) in a different manner than the previous request (322) to create the referencing worksheet.

Figure 5:
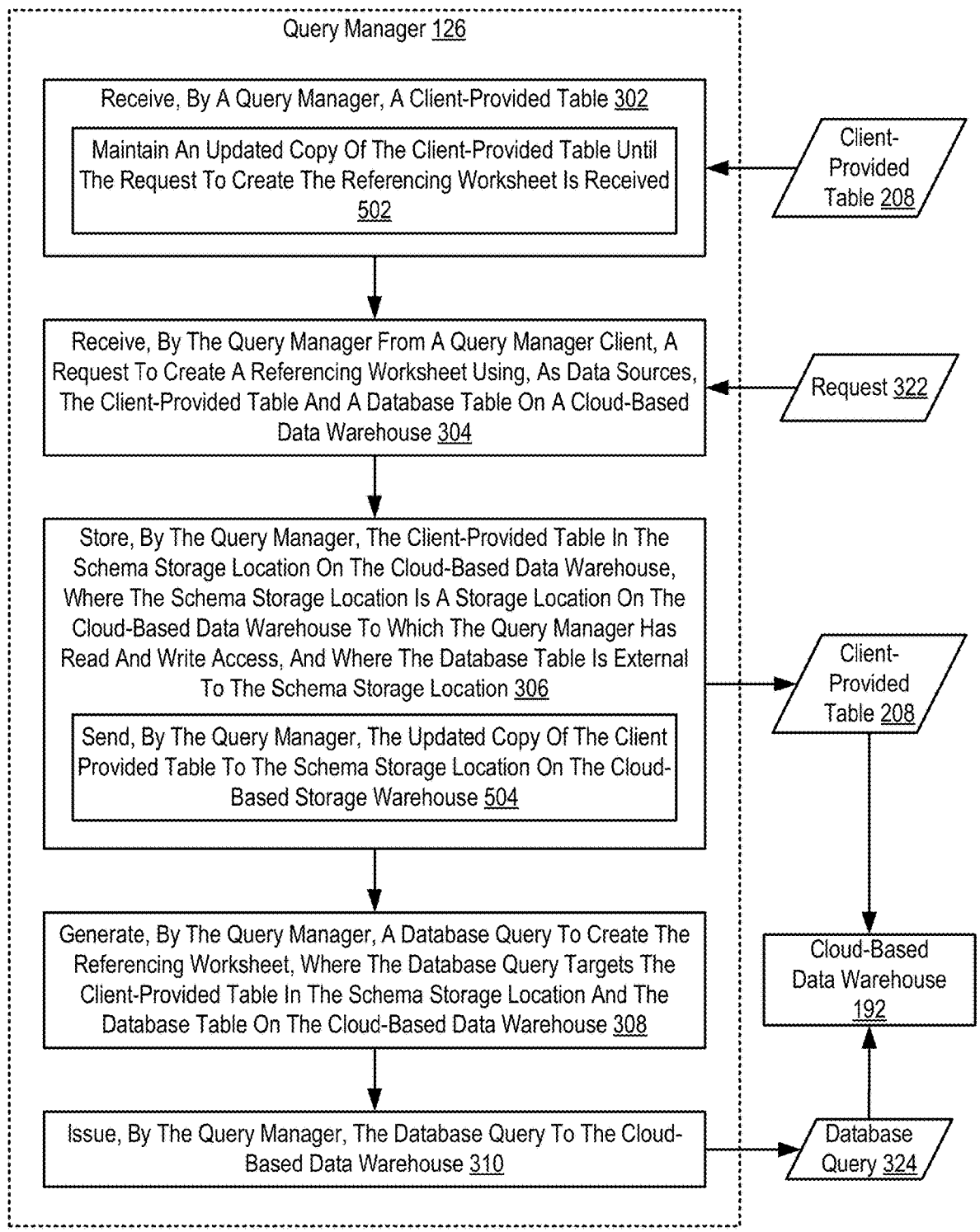
FIG. 5 sets forth a flow chart illustrating an exemplary method for enabling editable tables on a cloud-based data warehouse according to embodiments of the present invention.

For further explanation, FIG. 5 sets forth a flow chart illustrating a further exemplary method for enabling editable tables on a cloud-based data warehouse according to embodiments of the present invention that includes receiving (302), by a query manager (126), a client-provided table (208); receiving (304), by the query manager (126) from a query manager client, a request (322) to create a referencing worksheet using, as data sources, the client-provided table (208) and a database table on a cloud-based data warehouse (192); storing (306), by the query manager (126), the client-provided table (208) in the schema storage location on the cloud-based data warehouse (192), wherein the schema storage location is a storage location on the cloud-based data warehouse (192) to which the query manager (126) has read and write access, and wherein the database table is external to the schema storage location; generating (308), by the query manager (126), a database query (324) to create the referencing worksheet, wherein the database query (324) targets the client-provided table (208) in the schema storage location and the database table on the cloud-based data warehouse (192); and issuing (310), by the query manager (126), the database query (324) to the cloud-based data warehouse (192).

The method of FIG. 5 differs from the method of FIG. 3, however, in that receiving (302), by a query manager (126), a client-provided table (208) includes maintaining (502) an updated copy of the client-provided table (208) until the request to create the referencing worksheet is received. Maintaining (502) an updated copy of the client-provided table (208) until the request to create the referencing worksheet is received may be carried out by storing the client-provided table (208) locally on the query manager (126) computing system, including any subsequent edits to the client-provided table (208).

The method of FIG. 5 also differs from the method of FIG. 3 in that storing (306), by the query manager (126), the client-provided table (208) in the schema storage location on the cloud-based data warehouse (192), wherein the schema storage location is a storage location on the cloud-based data warehouse (192) to which the query manager (126) has read and write access, and wherein the database table is external to the schema storage location includes sending, by the query manager, the updated copy of the client provided table to the schema storage location on the cloud-based storage warehouse includes sending (504), by the query manager (126), the updated copy of the client provided table to the schema storage location on the cloud-based storage warehouse (192). Sending (504), by the query manager (126), the updated copy of the client provided table to the schema storage location on the cloud-based storage warehouse (192) may be carried out by sending the most recent version of the client-provided table (208) to the schema storage location on the cloud-based storage warehouse (192). The updated copy of the client-provided table (208) may replace an older version of the client-provided table (208) in the schema storage location on the cloud-based storage warehouse (192).

In view of the explanations set forth above, readers will recognize that the benefits of enabling editable tables on a cloud-based data warehouse according to embodiments of the present invention include:

Improving the operation of a computing system by providing a mechanism to generate a database query to create a worksheet incorporating both data from a database unalterable by a user and data from a table alterable by a user, increasing computing system functionality and usability.

Improving the operation of a computing system by providing a platform by which a client-provided table may be updated without frequent access to a schema storage location on a data warehouse, increasing computing system efficiency and functionality.

Exemplary embodiments of the present invention are described largely in the context of a fully functional computer system for enabling editable tables on a cloud-based data warehouse. Readers of skill in the art will recognize, however, that the present invention also may be embodied in a computer program product disposed upon computer readable storage media for use with any suitable data processing system. Such computer readable storage media may be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the invention as embodied in a computer program product. Persons skilled in the art will recognize also that, although some of the exemplary embodiments described in this specification are oriented to software installed and executing on computer hardware, nevertheless, alternative embodiments implemented as firmware or as hardware are well within the scope of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of enabling editable tables on a cloud-based data warehouse, the method comprising:
   receiving, by a query manager, a client-provided table;
   storing, by the query manager, the client-provided table in the schema storage location on the cloud-based data warehouse, wherein the schema storage location is a storage location on the cloud-based data warehouse to which the query manager has read and write access;
   generating, by the query manager, a database query to create a worksheet using the client-provided table as a data source, wherein the database query targets the client-provided table in the schema storage location; and
   issuing, by the query manager, the database query to the cloud-based data warehouse.

2. The method of claim 1, further comprising:
   receiving, by the query manager from the query manager client, an update for the client-provided table; and
   applying, by the query manager, the update to the client-provided table stored in the schema storage location on the cloud-based data warehouse.

3. The method of claim 1, further comprising:
   receiving a request to create a worksheet by joining the client-provided table and a database table.

4. The method of claim 1, wherein the database query comprises an instruction, to the cloud-based data warehouse, to perform a computation using the client-provided table in the schema storage location.

5. The method of claim 1,
   wherein receiving, by the query manager, the client-provided table comprises maintaining an updated copy of the client-provided table, and
   wherein storing, by the query manager, the client-provided table in the schema storage location on the cloud-based data warehouse comprises sending, by the query manager, the updated copy of the client provided table to the schema storage location on the cloud-based storage warehouse.

6. The method of claim 1, wherein the client-provided table comprises a join key to a database table.

7. The method of claim 1, wherein the query manager has read-only access to a database table on the cloud-based data warehouse.

8. An apparatus for enabling editable tables on a cloud-based data warehouse, the apparatus comprising a computer processor, a computer memory operatively coupled to the computer processor, the computer memory having disposed within it computer program instructions that, when executed by the computer processor, cause the apparatus to carry out the steps of:
   receiving, by a query manager, a client-provided table;
   storing, by the query manager, the client-provided table in the schema storage location on the cloud-based data warehouse, wherein the schema storage location is a storage location on the cloud-based data warehouse to which the query manager has read and write access;
   generating, by the query manager, a database query to create a worksheet using the client-provided table as a data source, wherein the database query targets the client-provided table in the schema storage location; and
   issuing, by the query manager, the database query to the cloud-based data warehouse.

9. The apparatus of claim 8, wherein the computer program instructions further cause the apparatus to carry out the steps of:
   receiving, by the query manager from the query manager client, an update for the client-provided table; and
   applying, by the query manager, the update to the client-provided table stored in the schema storage location on the cloud-based data warehouse.

10. The apparatus of claim 8, wherein the computer program instructions further cause the apparatus to carry out the steps of:
    receiving a request to create a worksheet by joining the client-provided table and a database table.

11. The apparatus of claim 8, wherein the database query comprises an instruction, to the cloud-based data warehouse, to perform a computation using the client-provided table in the schema storage location.

12. The apparatus of claim 8,
    wherein receiving, by the query manager, the client-provided table comprises maintaining an updated copy of the client-provided table, and wherein storing, by the query manager, the client-provided table in the schema storage location on the cloud-based data warehouse comprises sending, by the query manager, the updated copy of the client provided table to the schema storage location on the cloud-based storage warehouse.

13. The apparatus of claim 8, wherein the client-provided table comprises a join key to a database table.

14. The apparatus of claim 8, wherein the query manager has read-only access to a database table on the cloud-based data warehouse.

15. A computer program product for enabling editable tables on a cloud-based data warehouse, the computer program product disposed upon a computer readable medium, the computer program product comprising computer program instructions that, when executed, cause a computer to carry out the steps of:
receiving, by a query manager, a client-provided table;
storing, by the query manager, the client-provided table in the schema storage location on the cloud-based data warehouse, wherein the schema storage location is a storage location on the cloud-based data warehouse to which the query manager has read and write access;
generating, by the query manager, a database query to create a worksheet using the client-provided table as a data source, wherein the database query targets the client-provided table in the schema storage location; and
issuing, by the query manager, the database query to the cloud-based data warehouse.

16. The computer program product of claim 15, wherein the computer program instructions further cause the computer to carry out the steps of:
receiving, by the query manager from the query manager client, an update for the client-provided table; and
applying, by the query manager, the update to the client-provided table stored in the schema storage location on the cloud-based data warehouse.

17. The computer program product of claim 15, wherein the computer program instructions further cause the computer to carry out the steps of:
receiving a request to create a worksheet by joining the client-provided table and a database table.

18. The computer program product of claim 15, wherein the database query comprises an instruction, to the cloud-based data warehouse, to perform a computation using the client-provided table in the schema storage location.

19. The computer program product of claim 15,
wherein receiving, by the query manager, the client-provided table comprises maintaining an updated copy of the client-provided table, and
wherein storing, by the query manager, the client-provided table in the schema storage location on the cloud-based data warehouse comprises sending, by the query manager, the updated copy of the client provided table to the schema storage location on the cloud-based storage warehouse.

20. The computer program product of claim 15, wherein the client-provided table comprises a join key to a database table.

\* \* \* \* \*